United States Patent [19]

Sogah

[11] Patent Number: 4,822,859

[45] Date of Patent: Apr. 18, 1989

[54] GROUP TRANSFER POLYMERIZATION AND INITIATORS THEREFOR

[75] Inventor: Dotsevi Y. Sogah, Wilmington, Del.

[73] Assignee: E. I. Du Pont de Nemours and Company, Wilmington, Del.

[21] Appl. No.: 4,831

[22] Filed: Jan. 13, 1987

Related U.S. Application Data

[63] Continuation-in-part of Ser. No. 872,610, Jun. 10, 1986, abandoned.

[51] Int. Cl.$^4$ ............ C08F 6/06; C08F 4/16; C08F 6/00
[52] U.S. Cl. ............... 525/326.7; 525/329.7; 525/330.3; 525/355; 526/194
[58] Field of Search ............... 526/190, 194; 525/326.7, 329.7, 330.3

[56] References Cited

U.S. PATENT DOCUMENTS

| | | | |
|---|---|---|---|
| 3,928,302 | 12/1975 | Hargis et al. | 526/173 |
| 4,251,650 | 2/1981 | Mietzsch et al. | 526/194 |
| 4,252,925 | 2/1981 | Fukuda et al. | 526/77 |
| 4,310,640 | 1/1982 | Kato et al. | 525/100 |
| 4,351,924 | 9/1982 | Andrews et al. | 525/330.6 |
| 4,430,504 | 2/1984 | Reuter et al. | 556/482 |
| 4,481,364 | 11/1984 | Chu et al. | 556/413 |
| 4,491,669 | 1/1985 | Arkles et al. | 556/410 |
| 4,506,087 | 3/1985 | Fischer et al. | 556/471 |
| 4,508,880 | 4/1985 | Webster | 526/194 |
| 4,524,196 | 6/1985 | Farnham et al. | 526/194 |
| 4,556,722 | 12/1985 | Quirk et al. | 556/413 |
| 4,558,146 | 12/1985 | Kanner et al. | 556/410 |
| 4,579,965 | 4/1986 | Kanner et al. | 556/479 |

FOREIGN PATENT DOCUMENTS 0184692  6/1986  European Pat. Off. .

OTHER PUBLICATIONS

J.A.C.S., vol. 105, pp. 5706–5707, Webster et al.

*Primary Examiner*—Joseph L. Schofer
*Assistant Examiner*—Peter F. Kulkosky

[57] ABSTRACT

Novel silicon-based initiators, for example, [(1-methoxy-2-methyl-1-propenyl)oxy]trimethoxysilane, for Group Transfer Polymerization.

34 Claims, No Drawings

GROUP TRANSFER POLYMERIZATION AND INITIATORS THEREFOR

CROSS-REFERENCE TO RELATED APPLICATION

This is a file wrapper continuation-in-part of application Ser. No. 872,610 filed June 10, 1986 now expressly abandoned.

BACKGROUND OF THE INVENTION

1. Field of the Invention

This invention relates to Group Transfer Polymerization and to selected silicon-based compounds which are useful as initiators therein.

2. Background

U.S. Pat. Nos. 4,414,372; 4,417,034; 4,508,880; 4,524,196; 4,581,428; 4,588,795; 4,645,716; 4,622,372; 4,656,233; 4,681,918; and 4,771,942, and and commonly assigned U.S. patent application Ser. No. 707,192 filed Mar. 1, 1985 and now abandoned, referred to hereinafter as "the aforesaid patents and patent applications", disclose processes for polymerizing a polar acrylic or maleimide monomer to a "living" polymer in the presence of an initiator, which is a tetracoordinate organosilicon, organotin or organogermanium compound having at least one initiating site, and a co-catalyst which is a source of bifluoride, fluoride, cyanide or azide ions or a suitable Lewis acid, Lewis base or selected oxyanion. Such polymerization processes have become known in the art as Group Transfer Polymerization (Webster et al. J. Am. Chem. Soc. 105, 5706 (1983)).

Preferred monomers for use in Group Transfer Polymerization are selected from acrylic and maleimide monomers of the formula $CH_2=C(Y)X$ and

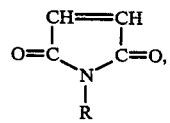

and mixtures thereof, wherein:

X is $-CN$, $-CH=CHC(O)X'$ or $-C(O)X'$;
Y is $-H$, $-CH_3$, $-CN$ or $-CO_2R$, provided, however, when X is $-CH=CHC(O)X'$, Y is $-H$ or $-CH_3$;
X' is $-OSi(R^1)_3$, $-R$, $-OR$ or $-NR'R''$;
each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$; is:
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more reactive substituents of the formula $-Z'-(O)C-C(Y^1)=CH_2$ wherein $Y^1$ is $-H$ or $-CH_3$ and $Z'$ is O or $NR'$ wherein $R'$ is as defined below; and each of $R'$ and $R''$ is independently selected from $C_{1-4}$ alkyl.

Preferred initiators are selected from tetracoordinate organsilicon, organotin and organogermanium compounds of the formulas $(R^1)_3MZ$, $(R^1)_2M(Z^1)_2$ and $O[M(R^1)_2Z^1]_2$ wherein:

$R^1$ is as defined above for the monomer;
Z is an activating substituent selected from the group consisting of

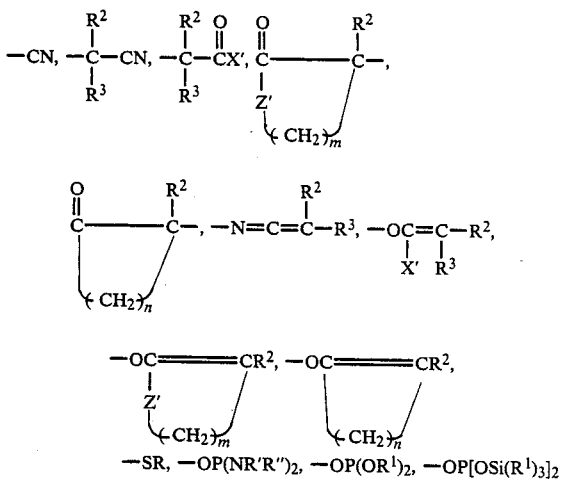

$-SR$, $-OP(NR'R'')_2$, $-OP(OR^1)_2$, $-OP[OSi(R^1)_3]_2$ and mixtures thereof;

X', R', R'', R and $R^1$ are as defined above for the monomer;
each of $R^2$ and $R^3$ is independently selected from $-H$ and hydrocarbyl, defined as for R above, subparagraphs (a), (c) and (d);
Z' is as defined above for the monomer;
m is 2, 3 or 4;
n is 3, 4 or 5;
$Z^1$ is

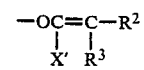

wherein X', $R^2$ and $R^3$ are as defined above;
at least one of any R, $R^2$ and $R^3$ in the initiator contains one or more initiating substituents of the formula $-Z^2-M(R^1)_3$ wherein $R^1$ is as defined above and M is as defined below;
$Z^2$ is a diradical selected from the group consisting of

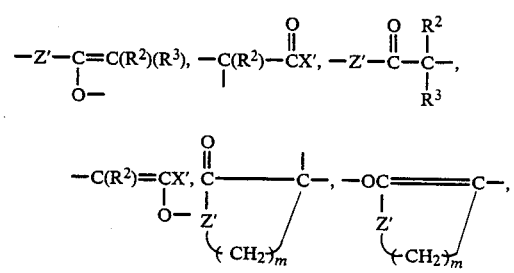

-continued

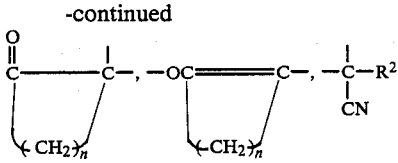

and mixtures thereof, wherein $R^2$, $R^3$, $X'$, $Z'$, m and n are as defined above;

$R^2$ and $R^3$ taken together are

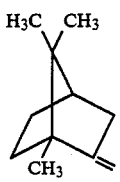

provided, however, Z is

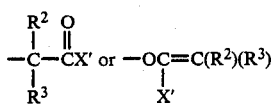

and/or $Z^2$ is

$X'$ and either $R^2$ or $R^3$ taken together are

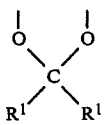

provided, however,

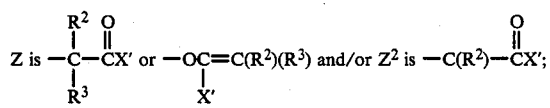

and
M is Si, Sn, or Ge, provided, however, Z is

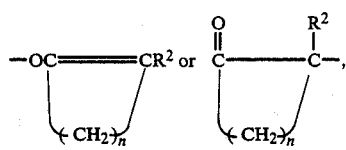

M is Sn or Ge, and provided, however, when $Z^2$ is

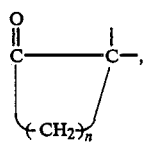

M is Sn or Ge.

Preferred co-catalysts are selected from a source of bifluoride ions $HF_2^-$, or a source of fluoride, cyanide or azide ions, or a source of oxyanions, said oxyanions being capable of forming a conjugate acid having a pKa (DMSO) of about 5 to about 24, preferably about 6 to about 21, more preferably 8 to 18, or a suitable Lewis acid, for example, zinc chloride, bromide or iodide, boron trifluoride, an alkylaluminum oxide or an alkylaluminum chloride, or a suitable Lewis base, for example, a Lewis base of the formula selected from $(R^4)_3M'$ and

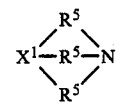

wherein:
M' is P or As;
$X^1$ is

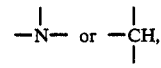

provided, however, when the monomer is a nitrile, $X^1$ is

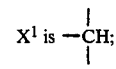

each $R^4$, independently, is:
(a) a $C_{1-12}$ alkyl, $C_{4-12}$ cycloalkyl, $C_{6-12}$ aralkyl or di($C_{1-4}$ alkyl)amino group;
(b) a group of (a) wherein two or three of the alkyl, cycloalkyl and/or aralkyl groups are joined together by means of one or more carbon-carbon bonds;
(c) a group of (a) or (b) wherein the alkyl, cycloalkyl and/or aralkyl groups contain within aliphatic segments thereof one or more hetero atoms selected from O, N and S; or
a group of (a), (b) or (c) wherein the alkyl, cycloalkyl and/or aralkyl groups contain one or more substituents that are unreactive under polymerizing conditions; and each $R^5$ is —$CH_2CH_2$— or —$CH_2CH_2$— containing one or more alkyl or other substituents that are unreactive under polymerizing conditions.

Additional details regarding Group Transfer Polymerization can be obtained from the aforesaid patents and patent applications, the disclosures of which are hereby incorporated by reference.

The present invention provides additional silicon-containing initiators which can be used in Group Transfer Polymerization. The initiators of the present invention are unique for Group Transfer Polymerization, but they are not useful in prior known conventional processes for polymerizing the same type of monomer.

U.S. Pat. No. 4,491,669 discloses alkoxyaminosilanes of the formula $R_mSi(OR')_n(NR''R''')_p$ wherein R is H, short chain alkyl or aryl; R' is short chain alkyl or aryl; R'' and R''' are separately H, short chain alkyl or aryl, at least one being other than H; m+n+p=4; and n and p are each at least 1.

U.S. Pat. No. 4,481,364 discloses silanes of the formula $R^1{}_aSiH(OR)_{3-a}$ wherein R and $R^1$ are, individually, monovalent $C_{1-10}$ hydrocarbon radicals and a is 0, 1 or 2. Also disclosed are silanes of the above formula wherein H is replaced with a 3-aminopropyl group.

U.S. Pat. No. 4,310,640 discloses various silanes which contain the moiety $X_{3-a}Si(R^1)_a$—$CH(R^2)$— wherein $R^1$ and $R^2$ are H or $C_{1-10}$ hydrocarbyl; X is halogen, alkoxy, phenoxyl, thioalkoxyl, aminooxyl, hydroxyl or amino; and a is 0, 1 or 2.

U.S. Pat. Nos. 4,251,650 and 4,430,504 disclose silyl ethers, useful as free radical polymerization initiators, which contain the moiety $(R^9)(R^{10})(R^{11})SiO$—C—C— wherein $R^9$ can include methyl, ethyl, phenyl, benzyl, chloromethyl or a silicon-substituted 1,2-dioxyethyl moiety (A); $R^{10}$ can include chloro, hydroxyl, methoxyl, ethoxyl or A; and $R^{11}$ can include Cl, OH or A.

U.S. Pat. No. 4,556,722 discloses a process for the preparation of aminopropylalkoxysilanes of the formula $(R^2)(R^3)NCH_2CH(R^4)CH_2Si(R_a)(OR^1)_{3-a}$ wherein R and $R^1$ are alkyl, $R^2$ and $R^3$ are H, alkyl, alkenyl, aminoalkyl or phenyl, $R^4$ is H or alkyl, and a is 0, 1 or 2 by reacting a silane of the formula $(R_a)HSi(OR^1)_{3-a}$ with an alkenylamine.

U.S. Pat. No. 4,506,087 discloses the preparation of alkoxysilanes by reacting chlorosilanes of the formula $(R_a{}^1)(R_b{}^2)SiCl_{4-a-b}$ wherein the R groups are H or hydrocarbyl, a is 0 or 1-3 and b is 0 or 1, (a—b) being equal to or greater than 3, with alcohols.

U.S. Pat. No. 4,558,146 discloses the preparation of vinylaminosilanes of the formula $R'''CH=CHSi(NRR')_x(R'')_{3-x}$ wherein R' and R''', independently, are H or hydrocarbyl, R and R'', independently, are hydrocarbyl, and x is an integer of 1–3, by reacting an aminosilane with an alkyne.

U.S. Pat. No. 4,579,965 discloses the preparation of vinyl tri-t-alkoxysilanes of the formula $R'''CH=CHSi(OCRR'R'')_3$ wherein R''' is H or hydrocarbyl, and R, R' and R'', independently, are hydrocarbyl, by reacting a tri-alkoxysilane with an alkyne in the presence of a platinum hydrosilation catalyst.

There is no suggestion in any of the aforesaid patents that such or similar silicon-containing compounds would be useful as initiators in Group Transfer Polymerization.

DETAILED DESCRIPTION OF THE INVENTION

The invention resides in the Group Transfer Polymerization process wherein the initiator is of the formula $Z^1$—$Si(Q')_3$, $(Z^1)_2$—$Si(Q')_2$, $[Z^1(Q')_2Si]_2O$ or $Z^2$—$Si(Q')_3$ wherein:

each Q', independently, is selected from $R^1$, $OR^1$, $SR^1$ and $N(R^1)_2$ provided, however all of the Q' groups are not $R^1$;

$Z^1$ is

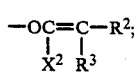

$Z^2$ is —CN or —NC;
$X^2$ is —OSi$(R^1)_3$, —$R^6$, —$OR^6$ or —NR'R'';
$R^6$ is (a) a hydrocarbyl radical which is an aliphatic, alicyclic, aromatic or mixed aliphatic-aromatic radical containing up to 20 carbon atoms;
(b) a hydrocarbyl radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites; and each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H;

each of $R^2$ and $R^3$ is independently selected from —H and hydrocarbyl, defined as for $R^6$ above, subparagraphs (a) to (e);

each of R' and R'' is independently selected from $C_{1-4}$ alkyl.

By initiating site is meant a group comprising a silicon-containing moiety such as —Si$(R^1)_3$, —$(Q')_3$ or —Si$(Q')_2$— wherein $R^1$ and Q' are defined as above, derived from a Group Transfer Polymerization initiator, including those employed in the present invention.

The initiators employed in this invention are believed to be known or obvious compounds, but their use as initiators in Group Transfer Polymerization is not suggested in the art. Preferred initiators are those wherein: $X^2$ (in $Z^1$) is —$OR^6$ and $R^6$ is —$CH_3$; each Q', independently, is selected from $R^1$, $OR^1$ and $N(R^1)_2$, provided, however, all of the Q' groups are not $R^1$; $R^1$ is —$CH_3$ or —$C_2H_5$; and $R^2$ and $R^3$ (in $Z^1$) are, independently, —H or —$CH_3$.

Preferred monomers for use in the present process are polar acrylic monomers of the formula $CH_2=C(Y)X$ wherein X and Y are defined as above; preferred forms of X and Y are those described in the aforementioned patents and patent applications.

The invention also resides in the polymer prepared by the invention process.

The invention further resides in the "living" polymer of the formula $R_p(Z^3\bar{P}QSi[Q']_3)_p$, $Z''\bar{P}QSi(Q')_3$, $[Z''\bar{P}Q]_2Si(Q')_2$ or $[Z''\bar{P}Q(Q')_2Si]_2O$ wherein:

Rp is a hydrocarbyl radical, of valence p, defined as for $R^6$ (a)–(d);

$Z^3$ is a diradical selected from the group consisting of —Z'—C(O)—C$(R^2)(R^3)$—, —C$(R^2)$(C(O)$X^2$)—, and mixtures thereof; Z', $R^2$, $R^3$ and $X^2$ are defined as above;

$\bar{P}$ is a divalent polymeric radical consisting essentially of at least three repeat units of at least one polar acrylic and/or maleimide monomer;

Q is a divalent radical consisting essentially of one or both tautomeric forms of a polar acrylic or maleimide unit;

p is an integer and is at least 1;

Z'' is selected from the group consisting of

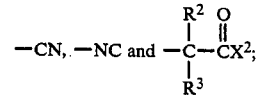

Z' is O or NR'; and

Q', R', $R^2$, $R^3$ and $X^2$ are defined as above.

By "living" polymer is meant a polymer of the invention which contains at least one terminal initiating site and is capable of polymerizing further in the presence of monomer(s) and catalyst Preferred "living" polymers are those wherein $\bar{P}$ consists essentially of repeat units of the formula —$CH_2CH(Y)(X^3)$— wherein $X^3$ is —CN, —CH=CH-C(O)$X^2$ or —C(O)$X^2$, and $X^2$ and Y are defined as above, especially wherein Y is $CH_3$, $X^2$ is $OR^6$ and $R^6$ is defined as above. Preferred "living" polymers also include those wherein Rp is a $C_{1-8}$ aliphatic hydrocarbyl radical and those wherein p is at least 2.

The polymers of the present invention include block and star-branched polymers prepared by methods similar to those described in the aforesaid patents and patent applications. Solutions or dispersions of the "living" polymers of the present invention in aprotic solvents are useful for casting films and fibers and may be formulated into specialty coating compositions for a variety of substrates. The "living" polymers may also be capped or quenched as descibed for related "living" polymers in the Group Transfer Polymerization art, and the capped or quenched products may be molded into shaped articles, including films and fibers. Polymers containing functional substituents introduced via monomer, initiator and/or capping agent can be post-reacted to provide cross-linked structures, block copolymers and the like.

As is already apparent from the above discussion, the reaction conditions, including temperatures, solvents, concentration and preferred monomers and catalysts (co-catalysts), are those described in the aforesaid patents and patent applications.

In the following examples of the invention, molecular weight of the polymer products ($\bar{M}_w$, $\bar{M}_n$) was measured by gel permeation chromatography (GPC). The polydispersity of the polymer is defined by $D = \bar{M}_w/\bar{M}_n$. Unless otherwise specified, the "living" polymer products were quenched by exposure to moist air or methanol before molecular weights were determined. Parts and percentages are by weight and temperatures are in degrees Celsius unless otherwise specified. Acronyms used to identify initiator compounds in the examples are defined in Table 1.

TABLE 1

| Acronym | Initiator |
|---|---|
| MPTMS | 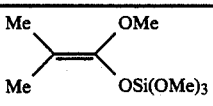 |
| MPTES | 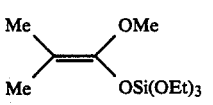 |
| MPDMS | 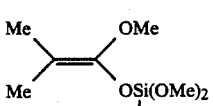 |
| MPDDS | 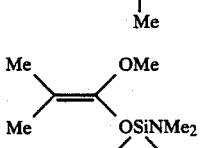 |

TABLE 1-continued

| Acronym | Initiator |
|---|---|
| MPBMS | 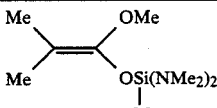 |
| MPDES | 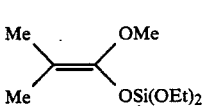 |
| MPEDS | 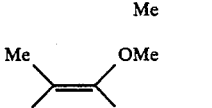 |

Me = methyl
Et = ethyl

EXAMPLE 1

A. Synthesis of [(1-Methoxy-2-methyl-1-propenyl)oxy]triethoxysilane (MPTES)

A 3-necked 2-liter flask, equipped with a mechanical stirrer, thermocouple, dry-ice condenser, and a dropping funnel, was charged with tetrahydrofuran (200 mL) and diisopropylamine (70 mL, 0.50 mol) under an argon atmosphere. The mixture was cooled to 0° and n-butyllithium (313 mL, 1.6M in hexane) was added dropwise while the temperature was maintained at about 0°. The mixture was stirred for 30 minutes, followed by dropwise addition of methyl isobutyrate (57.3 mL, 0.50 mol). Stirring was continued at 0° for an additional 30 minutes and triethoxysilyl chloride (147 mL, 0.75 mol) was added. The mixture was stirred and allowed to warm up to room temperature overnight and filtered under argon to remove the precipitated lithium salts. The solvents were evaporated and the liquid residue was distilled, first using a Vigreux column, followed by spinning band distillation. The total MPTES obtained was 113.3 g (86% yield). This was identified by $^1$H NMR spectroscpy, IR (infrared) and GC/MS; (gas chromatography/mass spectroscopy) b.p. 59°–60°/0.15 mm Hg.

B. Polymerization of Methyl Methacrylate (MMA)

A 3-neck 100 mL flask equipped with a magnetic stirrer, thermocouple and an argon inlet was charged with tetrahydrofuran (THF, 40 mL), [(1-methoxy-2-methyl-1-propenyl)oxy]triethoxysilane (MPTES, 0.53 g, 2 mmol), and methyl methacrylate (2 g, 20 mmol). To this mixture was added 0.02 mL of tris(dimethylamino)-sulfonium bifluoride (TASHF$_2$, 1M solution in MeCN). The temperature rose by 6°. After the exotherm subsided, more monomer (8 g, 80 mmol) was added, followed by addition of 0.03 mL of TASHF$_2$. The mixture was stirred overnight and the solvent was evaporated to give 4.0 g of poly(methyl methacrylate) (PMMA); $\bar{M}_n$ 22,500, $\bar{M}_w$ 57,000, D 2.54.

The experiment was repeated using a redistilled initiator to give 3.90 g of PMMA; $\bar{M}_n$ 19,400, $\bar{M}_w$ 57,800, D 2.99.

EXAMPLE 2

The procedure of Example 1 was followed using n-butyl acrylate (12.8 g, 100 mmol) in the place of methyl methacrylate. During the monomer/catalyst mixture addition, the temperature rose to 43.4° from 25.2°. Normal work-up gave 9.2 g of poly(n-butyl acrylate); $\overline{M}_n$ 3340, $\overline{M}_w$ 12,700, D. 3.79.

EXAMPLE 3

The procedure of Example 1 was followed using n-butyl acrylate (12.8 g, 100 mmol), THF (40 ml), MPTES (0.53 g, 2 mmol), and 1.0 mL of tetrabutyl ammonium acetate (0.1M in MeCN). This gave 7.6 g of poly(n-butyl acrylate); $\overline{M}_n$ 9810, $\overline{M}_w$ 23,600, D 2.40.

EXAMPLE 4

To a flask similarly equipped as in Example 1 were added TASHF$_2$ (0.4 mL, 0.1M in MeCN), [(1-methoxy-2-methyl-1-propenyl)oxy]dimethoxylmethylsilane (MPDMS, 0.83 g, 4.0 mmol), and THF (50 mL). To the mixture was added MMA (20.0 g, 200 mmol) at 1.0 mL/min via a syringe pump. The mixture was stirred overnight, quenched with methanol and evaporated to dryness. The residue was dissolved in acetone and poured into hexane to give PMMA as a white powder weighing 20.2 g; $\overline{M}_n$ 14,900, $\overline{M}_w$ 42,700, D 2.86.

EXAMPLE 5

The procedure of Example 4 was followed except that TASHF$_2$ was replaced by tetrabutylammonium 3-chlorobenzoate (0.40 mL, 0.1M in MeCN). Normal work-up followed by precipitation from hexane gave 20.3 g of PMMA as a white powder; $\overline{M}_n$ 16,600, $\overline{M}_w$ 46,200, D 2.79.

EXAMPLE 6

The procedure of Example 4 was followed using methyl methacrylate (20.0 g, 200 mmol), THF (50 mL), TASHF$_2$ (0.40 mL, 0.1M in MeCN), and [(1-methoxy-2-methyl-1-propenyl)oxy](dimethylamino)dimethylsilane (MPDDS, 0.81 g, 4.0 mmol). Evaporation of the solvent gave 13.3 g of PMMA; $\overline{M}_n$ 15,700, $\overline{M}_w$ 64,100, D 4.10.

EXAMPLE 7

The procedure of Example 4 was followed using the reagents of Example 6 except that tetrabutylammonium 3-chlorobenzoate (0.40 mL, 0.1M in MeCN) was used in the place of TASHF$_2$. Normal work-up gave 17.0 g of PMMA; $\overline{M}_n$ 18,300, $\overline{M}_w$ 49,900, D 2.73.

EXAMPLE 8

The procedure of Example 6 was followed using TASHF$_2$ (0.40 mL, 0.10M in MeCN) as catalyst and [(1-methoxy-2-methyl-1-propenyl)oxy]bis(dimethylamino)methylsilane (MPBMS, 0.93 g, 0.40 mmol) as initiator. Normal work-up gave 1.0 g of powdered white PMMA.

EXAMPLE 9

A reactor equipped as described in Example 1 was charged with MMA (10.0 g. 100 mmol), MPTES (0.53 g, 2.0 mmol) and THF (20 mL). This was immediately followed by the dropwise addition of tetrabutylammonium acetate in THF as catalyst. After an initial induction period of about 10 minutes, a vigorous reaction ensued. After the exotherm subsided, methanol (5 mL) was added and the solvents were evaporated to give 9.0 g of PMMA; $\overline{M}_n$ 33,800, $\overline{M}_w$ 274,000, D 8.11.

EXAMPLE 10

A reactor equipped as described in Example 1 was charged with potassium bifluoride (0.40 g, 5.13 mmol), dimethyl formamide (2.0 mL), acetonitrile (30 mL), and MPTES (1.32 g, 5.0 mmol). Then MMA was added at 1.0 mL/min and the resulting mixture was stirred overnight. After addition of methanol, the solvents were evaporated and the residue was precipitated from methanol to give 10.3 g of PPMA; $\overline{M}_n$ 2400, $\overline{M}_w$ 5740, D 2.39.

EXAMPLE 11

A reactor equipped as described in Example 1 was charged with ZnBr$_2$ (1.0 g, 4.4 mmol), 1,2-dichloromethane (50 mL) and MPTES (0.53 g, 2.0 mmol). Then MMA was added dropwise at 1.0 mL/min. The resulting mixture was stirred overnight and evaporated; the residue was dried to give 3.8 g of white PMMA which was purified by precipitation from MeOH to give 2.2 g of white, powdery solid PMMA; $\overline{M}_n$ 29,800, $\overline{M}_w$ 264,000, D 8.87. The product contained about 10% of high molecular weight material. When correction was made for the high molecular weight component, the GPC analyses gave $\overline{M}_n$ 29,800, $\overline{M}_w$ 70,000, and D 2.35.

EXAMPLE 12

The procedure of Example 11 was followed using n-butyl acrylate (12.8 g, 100 mmol). Normal work-up gave 11.2 g of poly(n-butyl acrylate) which was further dried to give 10.0 g of polymer; $\overline{M}_n$ 4750, $\overline{M}_w$ 5900, D 1.24.

EXAMPLE 13

The procedure of Example 4 was followed using MMA (20 g, 200 mmol), TASHF$_2$ (0.40 mL, 0.1M in MeCN), THF (50 mL), and [(1-methoxy-2-methyl-1-propenyl)oxy]diethoxymethylsilane (MPDES, 0.94 g, 4.0 mmol). Normal work-up gave 10.9 g of white solid PMMA which was dissolved in acetone and poured into hexane to give 10.6 g of PMMA as a white powder (identified by $^1$H NMR); $\overline{M}_n$ 27,900, $\overline{M}_w$ 109,000, D 3.91.

EXAMPLE 14

The procedure of Example 4 was followed, replacing MPDMS by [(1-methoxy-2-methyl-1-propenyl)oxy]dimethylethoxysilane (MPEDS, 0.82 g, 4.0 mmol). Normal work-up gave 20.1 g of PMMA; $\overline{M}_n$ 7100, $\overline{M}_w$ 14,600, D 2.06.

EXAMPLE 15

The procedure of Example 14 was followed, replacing TASHF$_2$ by tetrabutylammonium 3-chlorobenzoate (0.40 mL, 0.1M in MeCN). Work-up gave 20.9 of PMMA; $\overline{M}_n$ 10,600, $\overline{M}_w$ 23,200, D 2.18.

EXAMPLE 16

Polymerization of MMA Initiated by [(1-Methoxy-2-methyl-1-propenyl)oxy]trimethoxysilane (MPTMS) Prepared in Situ A 3-necked flask equipped with an argon inlet, a stirrer and a thermocouple was charged with methyl α-bromoisobutyrate (1.81 g, 10 mmol), Zn metal (0.65 g, 10 mmol) and tetramethoxysilane (20 mL). After an accompanying 5° exotherm had subsided, methyl methacrylate was added and the mixture was stirred overnight. Then tetrabutylammonium fluoride (0.20 mL, 1M in THF) was added. After stirring for 4 h, methanol (10 mL) was added and the solvents were evaporated. The residue was dissolved in ethyl acetate, washed first with water containing a few drops of HCl and then with saturated sodium chloride. The organic layer was dried over $MgSO_4$, filtered and evaporated to give 6 g of PMMA; $\overline{M}_n$ 90,000, $\overline{M}_w$ 171,000, D 1.90. The PMMA was dissolved acetone and precipitated from methanol; $\overline{M}_n$ 62,000, $\overline{M}_w$ 162,000, D 2.59.

EXAMPLE 17

A. Preparation of Tri(t-butoxy)cyanosilane and isocyanosilane

To a stirred solution of 9 g (57.6 mmol) of tetraethylammonium cyanide in 80 mL of anhydrous acetonitrile was added 17.2 g (57.6 mmol) of tri(t-butoxy)chlorosilane. The resulting solution was cooled to $-20°$ whereupon a precipitate formed. Then 35 mL of anhydrous ethyl ether was added, and the cold mixture was filtered under argon. The filtrate was evaporated under reduced pressure, and the residue was treated with ether and filtered under argon. The filtrate was concentrated under reduced pressure and distilled in a spinning band column. The products were collected in three fractions, and the third fraction (4.4 g, b.p. $44°/0.4$ mm) consisted of tri(t-butoxy)cyanosilane (IR: 2198 $cm^{-1}$) and tri(t-butoxy)isocyanosilane (IR: 2104 $cm^{-1}$). Anal Calcd for $C_{13}H_{27}O_3SiN$: C 57.10; H 9.95; N 5.12; Si 10.27. Found: C 57.00; H 9.88; N 5.42; Si 9.97; Cl 0.14.

B. Polymerization of MMA Initiated by Tri(t-butoxy)cyanosilane and isocyanosilane The following procedure was performed under a dry argon atmosphere. Tetraethylammonium cyanide (30 mg, 0.19 mmol) was treated with 9 mL of N,N-dimethylformamide to dissolve, and then 25 mL of tetrahydrofuran was added to obtain a honogeneous solution. Then 0.54 g (0.61 mL, 2 mmol) of the mixed silane product (third fraction) of Part A was added. Then 10 g (10.8 mL, 100 mmol) of MMA (purified over a column of neutral alumina under argon) was added rapidly. During 3 minutes only a slow temperature increase of 1° was observed, and then a rapid exothermic polymerization caused a temperature rise from 25° to 51°. After the reaction mixture had returned to room temperature, a sample was removed for NMR analysis. The analysis showed that conversion to polymer was 65%. The polymer was isolated by precipitation with aqueous methanol. GPC showed bimodality, with approximately equal amounts of high and low molecular weight polymer: $\overline{M}_n$ 8400, $\overline{M}_w$ 64,600, D 7.69. Estimates of the high and low molecular weight portions showed a low molecular weight fraction $\overline{M}_n$ 4190, $\overline{M}_w$ 6760; and a high molecular weight fraction: $\overline{M}_n$ 67,100, $\overline{M}_w$ 115,000. NMR analysis of the whole polymer showed it be 58.1% syndiotactic, 36.5% heterotactic and 5.4% isotactic.

BEST MODE FOR CARRYING OUT THE INVENTION

The best mode presently contempalted for carrying out the invention is represented by Examples 2, 4 to 8, 12, 13, 15 and 17.

I claim:

1. A Group Transfer Polymerization process comprising contacting under Group Transfer Polymerizing Conditions at least one polar acrylic or maleimide monomer with (i) a tetracoordinate organosilicon polymerization initiator having at least one initiating site and (ii) a co-catalyst which is a source of bifluoride, fluoride, cyanide or azide ions or a suitable Lewis acid, Lewis base or selected oxyanion, the process further characterized in that the initiator is of the formula $Z^1-Si(Q')_3$, $(Z^1)_2-Si(Q')_2$, $[Z^1(Q')_2Si]_2O$, or $Z^2-Si(Q')_3$ wherein:
each Q', independently, is selected from $R^1$, $OR^1$, $SR^1$ and $N(R^1)_2$, provided, however, all of the Q' groups are not $R^1$;
$Z^1$ is

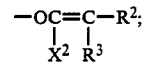

$Z^2$ is $-CN$ or $=NC$;
$X^2$ is $-OSi(R^1)_3$, $-R^6$, $-OR^6$ or $-NR'R''$;
$R^6$ is
(a) a hydrocarbyl radical which is an aliphatic, alicyclic, aromatic or mixed aliphatic-aromatic radical containing up to 20 carbon atoms;
(b) a polymeric hydrocarbyl radical containing at least 20 carbon atoms;
(c) a radical of (a) or (b) containing one or more ether oxygen atoms within aliphatic segments thereof;
(c) a radical of (a), (b) or (c) containing one of more functional substituents that are unreactive under polymerizing conditions; or
(e) a radical of (a), (b), (c) or (d) containing on or moe initiating sites;
each $R^1$, independently, is a hydrocarbyl radical which is an aliphatic, alicyclic, aromatic or mixed aliphatic-aromatic radical containing up to 20 carbon atoms or $-H$, provided that at least $R^1$ group is not $-H$;
each of $R^2$ and $R^3$ is independently selected from
(a) $-H$;
(b) a hydrocarbyl radical which is an aliphatic, alicyclic, aromatic or mixed aliphatic-aromatic radical containing up to 20 carbon atoms;
(c) a polymeric hydrocarbyl radical containing at least 20 carbon atoms;
(d) a radical of (b) or (c) containing one or more ether oxygen atoms with aliphatic segments thereof;
(e) a radical of (b), (c) or (d) containing one or more functional substituents that are unreactive under polymerizing conditions; and
(f) a radical of (b), (c), (d) or (e) containing one or more initiating sites; and
each of R' and R'' is independently selected from $C_{1-4}$ alkyl.

2. Process of claim 1 wherein each Q', independently, is selected from $R^1$, $OR^1$ and $N(R^1)_2$, provided, however, all of the Q' gropups are not $R^1$.

3. "Living" polymer of the formula $Rp(Z^3\overline{P}Qsi[Q']_3)_p$, $Z''\overline{P}QSi(Q')_3$, $[Z''\overline{P}Q]_2Si(Q')_2$ or $[Z''\overline{P}Q(Q')_2Si]_2O$ wherein:
Z'' is selected from the group consisting of

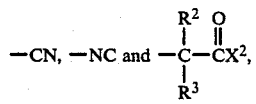

$Z^3$ is a diradical selected from the group consisting of —Z'—C(O)—C($R^2$)($R^3$)—, —C($R^2$)(C(O)$X^2$)— and mixtures thereof;

Rp is a radical, of valence p, selected from
(a) a hydrocarbyl radical which is an aliphatic, alicyclic, aromatic or mixed aliphatic-aromatic radical containing up to 20 carbon atoms;
(b) a polymeric hydrocarbyl radical containing at least 20 carbon atoms;
(c) a radical of (a) or (b) containing one or more ether oxygen atoms within aliphatic segments thereof; and
(c) a radical of (a), (b) or (c) containing one or more functional substituents that are unreactive under polymerizing conditions;

$\overline{P}$ is a divalent polymeric radical consisting essentially of at least three repeat units of at least one polar acrylic or maleimide monomer;

Q is a divalent radical consisting essentially of one or both tautomeric forms of a polar acrylic or maleimide unit;

p is an integer and is at least 1;

each Q', independently, is selected from $R^1$, $OR^1$, $SR^1$ and $N(R^1)_2$, provided, however, all of the Q' groups are not $R^1$;

each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H;

each of $R^2$ and $R^3$ is independently selected from
(a) —H;
(b) a hydrocarbyl radical which is an aliphatic, alicyclic, aromatic or mixed aliphatic-aromatic radical containing up to 20 carbon atoms;
(c) a polymeric hydrocarbyl radical containing at least 20 carbon atoms;
(d) a radical of (b) or (c) containing one or more ether oxygen atoms within aliphatic segments thereof;
(e) a radical of (b), (c) or (d) containing one or more functional substituents that are unreactive under polymerizing conditions; and
(f) a radical of (b), (c), (d) or (e) containing one or more initiating sites;

$X^2$ is —OSi($R^1$)$_3$, —$R^6$, —$OR^6$ or —NR'R";

$R^6$ is:
(a) a hydrocarbyl radical which is an aliphatic, alicyclic, aromatic or mixed aliphatic-aromatic radical containing up to 20 carbon atoms;
(b) a polymeric hydrocarbyl radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites;

Z' is O or NR'; and each of R' and R" is independently selected from $C_{1-4}$ alkyl.

4. Polymer of claim 3 wherein each Q', independently, is selected from $R^1$, $OR^1$ and $N(R^1)_2$, provided, however, all of the Q' groups are not $R^1$.

5. Process of claim 1 wherein the product is a "living" polymer.

6. Process of claim 1 wherein the monomer is a polar acrylic monomer of the formula $CH_2$=C(Y)X wherein:
X is —CN, —CH=CHC(O)X' or —C(O)X';
Y is —H, —CH$_3$, —CN or —CO$_2$R, provided, however, when X is —CH=CHC(O)X', Y is —H or —CH$_3$;
X' is —OSi($R^1$)$_3$, —R, —OR or —NR'R";
each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H;
R is:
(a) a hydrocarbyl radical whichis an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more reactive subsitutents of the formula —Z'-(O)C—C($Y^1$)=$CH_2$ wherein $Y^1$ is —H or —CH$_3$ and Z' is O or NR' wherein R' is as defined below; and
each of R' and R" is independently selected from $C_{1-4}$ alkyl.

7. Process of claim 6 wherein Y is —CH$_3$ and X is —C(O)X'.

8. Process of claim 7 wherein X' is —OR.

9. Process of claim 8 wherein R is $C_{1-4}$ alkyl.

10. Process of claim 9 wherein R is —CH$_3$.

11. Process of claim 2 wherein $X^2$ is —$OR^6$ and $R^6$ is a $C_{1-4}$ alkyl.

12. Process of claim 11 wherein $R^6$ is —CH$_3$.

13. Process of claim 8 wherein $R^1$ is —CH$_3$ or —$C_2H_5$.

14. Process of claim 2 wherein $R^2$ and $R^3$, independently, are H or hydrocarbyl containing up to 20 carbon atoms.

15. Process of claim 14 wherein hydrocarbyl contains one or more functional substituents that are unreactive under polymerizing conditions.

16. Process of claim 14 wherein hydrocarbyl contains one or more initiating sites.

17. Process of claim 15 wherein hydrocarbyl contains one or more initiating sites.

18. Polymer prepared by the process of claim 1.

19. Polymer of claim 3 wherein $\overline{P}$ consists essentially of repeat units of at least one polar acrylic monomer.

20. Polymer of claim 19 wherein the repeat units are of the formula —$CH_2$C(Y)($X^3$)— wherein:
$X^3$ is —CN, —CH=CHC(O)$X^2$ or —C(O)$X^2$; and
Y is —H, —CH$_3$, —CN or —CO$_2$R, provided, however, when $X^3$ is —CH=CHC(O)$X^2$, Y is —H or CH$_3$.

21. Polymer of claim 20 wherein Y is —CH$_3$, $X^2$ is $OR^6$ and $R^6$ is a hydrocarbyl radical containing up to 20 carbon atoms.

22. Polymer of claim 21 wherein $R^6$ also contains one or more functional substituents that are unreactive under polymerizing conditions.

23. Polymer of claim 21 wherein $R^6$ is $C_{1-4}$ alkyl.

24. Polymer of claim 23 wherein $R^6$ is —CH$_3$.

25. Polymer of claim 3 wherein $R^1$ (in Q') is $-CH_3$ or $-C_2H_5$.

26. Polymer of claim 3 wherein p is at least 2.

27. Polymer of claim 3 wherein Rp is a $C_{1-8}$ aliphatic hydrocarbon radical.

28. Polymer of claim 3 dissolved or dispersed in an aprotic solvent to produce a solution or dispersion.

29. Film prepared from the solution or dispersion of claim 28.

30. Coated substrate prepared from the solution or dispersion of claim 28.

31. Fiber prepared from the solution or dispersion of claim 28.

32. Process of preparing a living block polymer from the "living" polymer of claim 3 by adding unsatured monomers to said living polymer.

33. Living polymer of the process of claim 32.

34. Process comprising quenching the polymer of claim 3 with an active hydrogen source.

* * * * *